Figure 1:
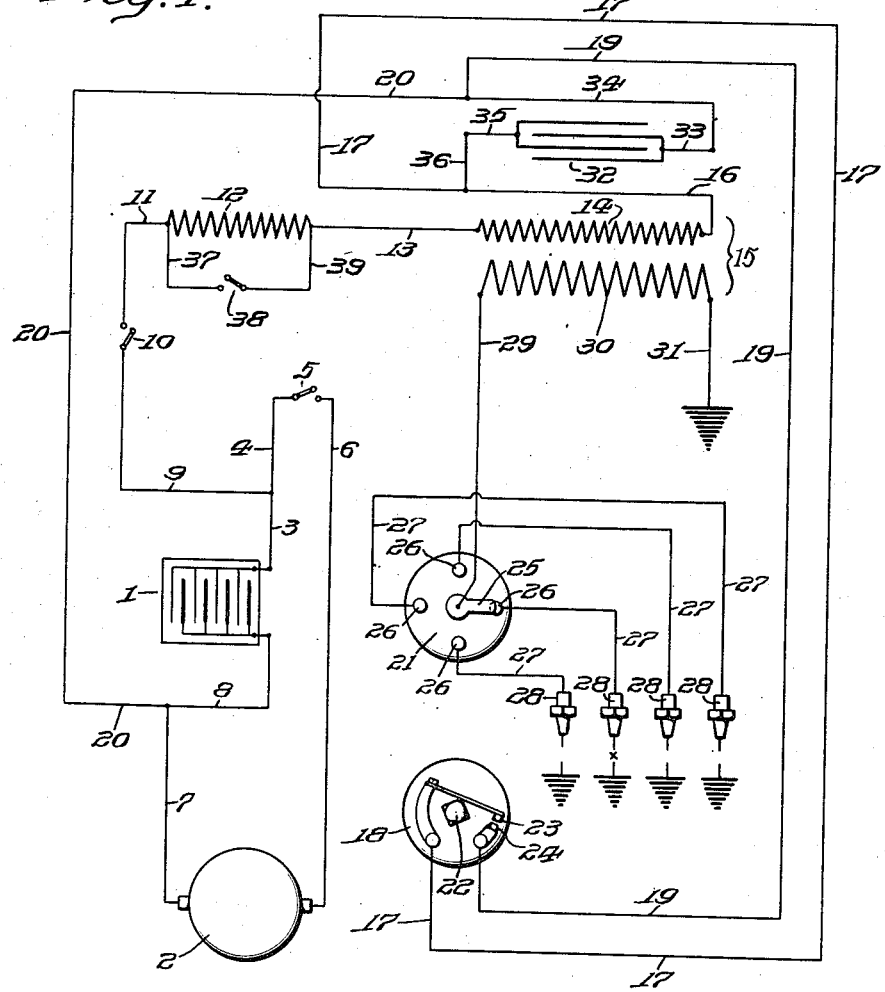

Jan. 1, 1924

A. A. KENT ET AL

IGNITION SYSTEM FOR INTERNAL COMBUSTION ENGINES

Filed July 27, 1917      3 Sheets-Sheet 1

1,479,388

WITNESS

INVENTORS
Arthur Atwater Kent.
William A. Evans.
BY
ATTORNEY.

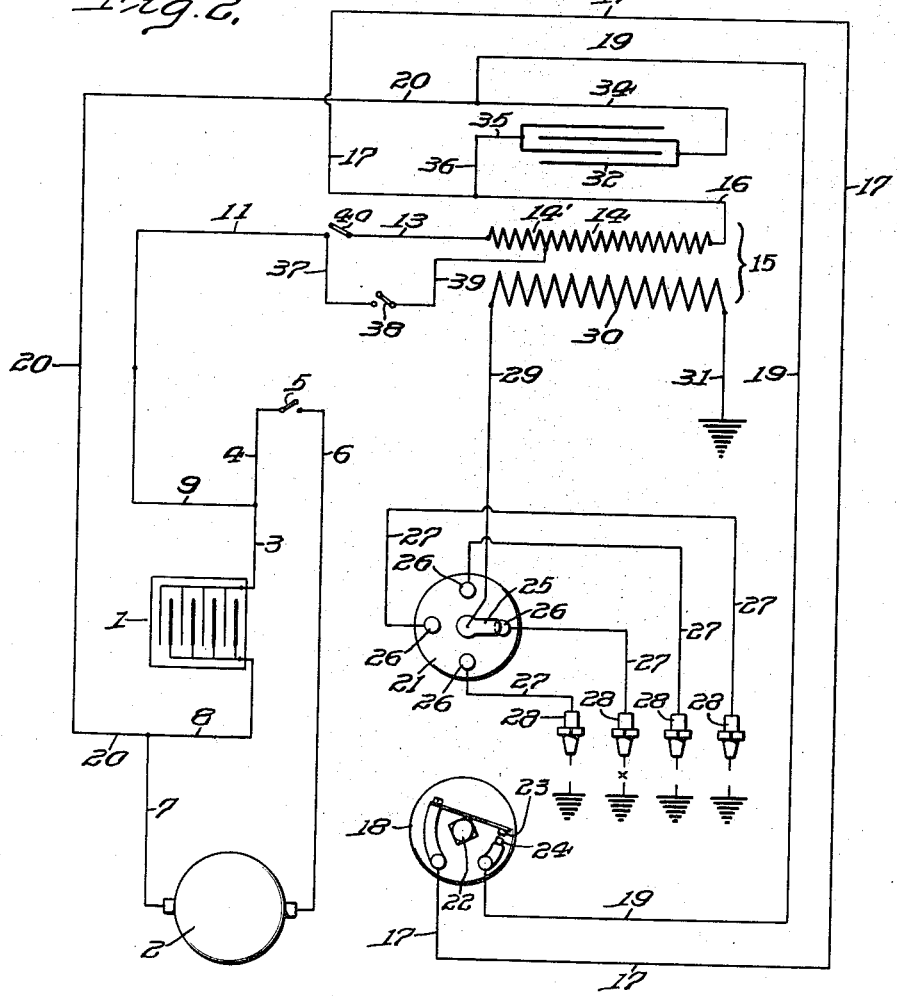

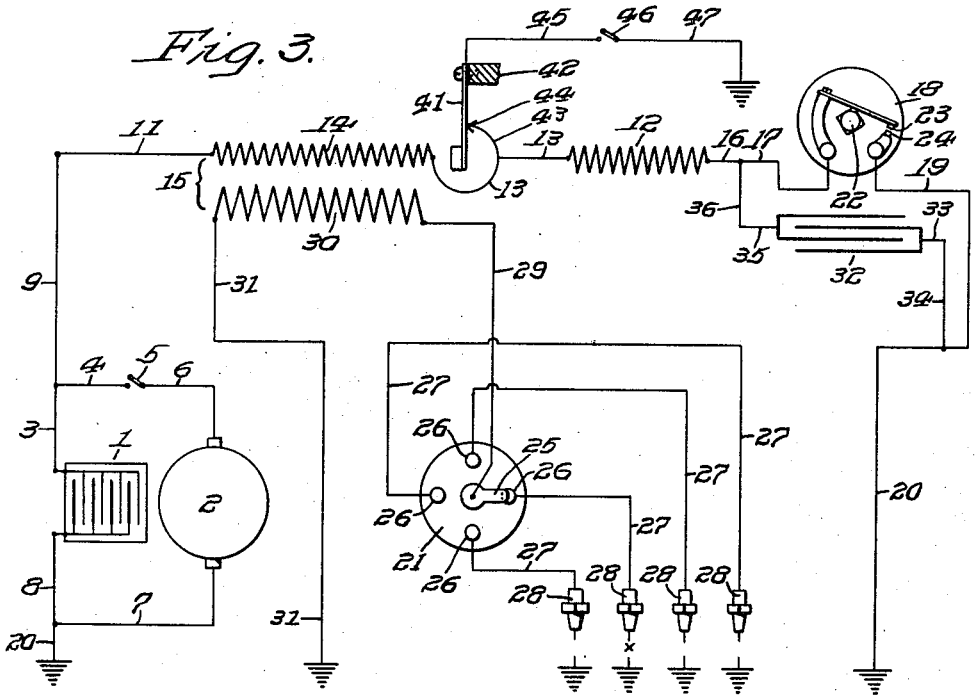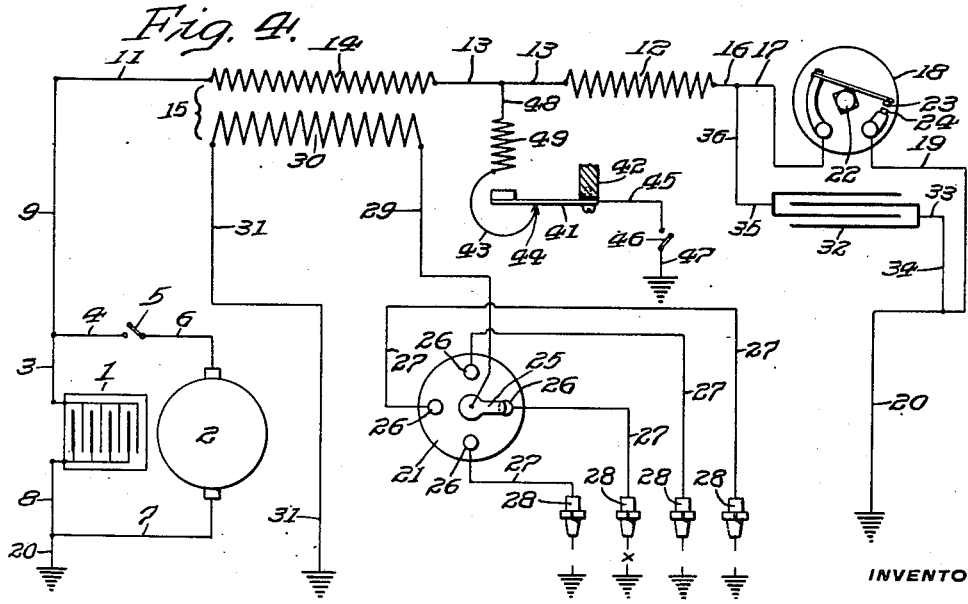

Patented Jan. 1, 1924.

1,479,388

UNITED STATES PATENT OFFICE.

ARTHUR ATWATER KENT, OF ROSEMONT, AND WILLIAM A. EVANS, OF FORT WASHINGTON, PENNSYLVANIA; SAID EVANS ASSIGNOR TO SAID KENT.

IGNITION SYSTEM FOR INTERNAL-COMBUSTION ENGINES.

Application filed July 27, 1917. Serial No. 183,025.

*To all whom it may concern:*

Be it known that we, ARTHUR ATWATER KENT and WILLIAM A. EVANS, both citizens of the United States, and residents, respectively, of Rosemont, in Montgomery County, and Fort Washington, in Montgomery County, both in the State of Pennsylvania, have invented certain new and useful Improvements in Ignition Systems for Internal-Combustion Engines, of which the following is a disclosure.

It often occurs that the source of electrical energy employed in the primary circuit of an ignition system of an internal combustion engine is not strong enough to induce a sufficient current in the secondary circuit to produce the hot spark required in starting an internal combustion engine. The battery, or other source of electrical energy, may induce, in the secondary, a current strong enough to ignite a charge after the engine has been running for a time, and is thoroughly warm, but it may not be sufficient to produce the necessary hot spark for cold weather starting. The battery may be too weak for starting purpose from several causes. The battery may be partly exhausted, or depleted, or may be one which is employed for the double purpose of supplying the necessary current to the ignition system, and for operating an electrical motor for starting or turning over the engine.

In those systems in which the same source of electrical energy is drawn upon to drive the electrical starting motor and to supply the ignition current, the primary current of the starting system is generally connected in parallel with the primary circuit of the ignition system, both circuits thus drawing their current from the same storage battery.

In such systems, the starting circuit offers relatively small resistance to the current, while the sparking circuit offers relatively high resistance to it. Consequently, when both circuits are closed, as in starting the engine, the starting motor draws heavily on the storage battery, the voltage of the battery is thus considerably reduced, and the current through the primary of the ignition circuit is too small to induce, in the secondary circuit, a current strong enough to produce the hot spark necessary to ignite the cold charge. This cutting down of the current in the sparking system by the starting apparatus is markedly observable in cold weather starting, when a hot spark is particularly required to ignite a cold charge in a cold engine.

The object of this invention is to provide means whereby the resistance or impedance of the primary circuit of the ignition system may be reduced when, for any reason, the voltage of the battery supplying current thereto is low, to increase the current through the primary circuit, sufficiently to induce a sufficient current in the secondary circuit to ignite the charge in the cylinders, by temporarily increasing the number of ampere-turns in the primary winding of the spark or induction coil to compensate for the low voltage of the battery, without changing the circuit connections to the battery.

Other objects will appear in the specification and claims below.

In the drawings forming a part of this specification, and in which the same reference characters are employed throughout to designate the same parts, Fig. 1 is a diagrammatic view of one embodiment of our invention;

Fig. 2 is a similar diagrammatic view of a modified form of our invention;

Fig. 3 diagrammatically illustrates a third modified form of our invention; and

Fig. 4 is a similar diagrammatic view of a further modification.

The various specific electrical appliances used are all indicated diagrammatically and may be of any kind or type suitable for the purposes set forth below; that is to say, the electric motor may be of any approved type and may be one which is so coupled to the engine as to be driven by the engine, when the engine is running, to operate as a dynamo for recharging the battery; the induction coil may be of one of many now on the market and used in ignition systems; the battery may be any suitable battery, although preferably a storage battery; and the switches may be suitable ones of any approved construction. The resistance coil, condenser, current interrupters, distributor and spark plugs, are all those usually employed in electrical apparatus.

Referring first to the embodiment of our invention illustrated in Fig. 1, the battery 1 may be and preferably is a storage battery, such as is used for supplying the necessary current for the ignition system of an internal combustion engine and for driving an electric motor 2 when the same is used to start the engine. Such a motor 2 is used relatively infrequently, and for relatively short periods, (in starting the engine), while the ignition system draws current from the battery 1 all the time that the engine is operating.

The starting circuit comprises the battery 1, wires 3 and 4, switch 5, wire 6, motor 2 and wires 7 and 8 back to battery 1.

The primary circuit of the ignition system comprises normally the battery 1, wires 3 and 9, ignition circuit switch 10, wire 11, external resistance coil 12, wire 13, primary winding or coil 14 of the induction or ignition coil 15, wires 16, 17, current interrupter 18, wires 19, 20, and 8 back to battery 1.

The interrupter 18 for the primary circuit may be a mechanical contact device, or contact maker, and is preferably of the closed circuit type, that is to say, it is a mechanical make and break device in which the contact points are normally held in electrical engagement with each other and the interruption or breaking of the current in the primary circuit is operative to induce the sparking current in the secondary circuit. The cam 22 of such a contact device is diagrammatically shown as operating to intermittently and regularly move a movable contact point 23 out of electrical engagement with a stationary contact point 24 to break the primary circuit. The contact device 18 and distributor 21 may be, and preferably are, connected to and driven by the engine.

The distributor 21 is also diagrammatically shown as an arm 25, rotated at the same speed as the cam 22 of the contact device 18 to bring its free end into consecutive engagement with a plurality of contacts 26 arranged in a circle about the pivoted or journaled end of the arm 25. Each contact 26 of the distributor is respectively connected by a wire 27 to a spark plug 28 of the engine and the rotatable arm 25 is electrically connected by a wire 29 to the secondary winding or coil 30 of the induction or ignition coil 15 at the time when the primary circuit is broken by the contact maker 18.

The other end of the coil 30 is grounded to the engine through wire 31 and the spark plugs are also grounded to the engine in the usual manner. Preferably a condenser 32 is arranged to bridge the contact points 23 and 24 of the contact maker 18 to prevent arcing between them and this may be accomplished by connecting one terminal 33 of the condenser 32 by a wire 34 to the lead or wire 19 leading to the stationary contact point 24 of the contact device 18, and connecting the other terminal 35 of the condenser 32 by a wire 36 with the lead or wire 17 leading to the movable contact point 23.

The resistance coil 12 is adapted to be short circuited by a wire 37 connected to one end thereof and extending to a switch 38, and by a wire 39 connected to the other end of said coil 12, and also connected to said switch 38.

The operation of the apparatus is as follows. Assuming the arrangement to be in the condition indicated in the drawings, with the switches 5, 10, and 38 all open, and the engine stopped or not running, the ignition circuit is first closed by closing the switch 10 and then the motor circuit is closed by closing the switch 5. The closing of the motor circuit will start the motor 2 to turn the engine, and the contact maker cam 22 and distributor arm 25, which are connected to and driven by the engine, are rotated in the usual manner.

If, now, by reason of the heavy current drawn from the battery 1 by the motor 2, the voltage of the battery is reduced or lowered so much that the current, induced in the secondary circuit, is insufficient to produce a hot spark in the cylinders to ignite the charge, the operator then closes the switch 38 cutting the resistance 12 out of the primary circuit. This permits more current to pass through the primary circuit and through the primary winding 14 of the induction coil 15.

This closing of the switch 38 and consequent short circuiting of the external resistance 12, thus increases the number of ampere-turns of the primary coil and induces a sufficiently greater current in the secondary circuit to produce hotter sparks in the cylinders of the engine. As soon as the engine begins to run under its own power, the switch 5 is opened to break the motor circuit, and since the motor is no longer drawing current from the battery 1, the switch 38 may shortly thereafter be opened to introduce the resistance 12 again into the primary circuit, thus decreasing the number of ampere-turns of the primary winding of the induction coil when the engine is warm, and the normal current in the primary circuit is sufficient to properly ignite the explosive mixture.

A similar result may be attained by the arrangement diagrammatically shown in Fig. 2. In this embodiment of our invention the external resistance coil 12 may be dispensed with and a relatively few coils of the primary winding 14 of the induction coil 15 may be cut out at will to increase the number of ampere-turns of the primary coil.

In this modification, the arrangement and disposition of all the various parts of the apparatus are the same as those which have been above described with reference to Figure 1, except that the switch 10 is omitted, the coil 12 is replaced by the ignition circuit switch 40, the wire 13 is connected to the said switch 40, and the wire 39 is tapped into the windings of the primary coil 14 to cut out of the primary circuit a portion 14' of the said coil 14 when the switch 40 is open and the switch 38 is closed. The induction of a primary circuit, when rapidly made and broken in the ignition circuits of high speed internal combustion engines, is considerable and the impedance to the current through the primary circuit, due to inductance, may be materially reduced by cutting out a portion of the primary winding. When, therefore, e. g., in cold weather starting, the current flowing through the primary circuit is found to be insufficient to produce a hot spark to ignite the cold charge in the cylinders, the switch 38 may be closed, the switch 40 opened, and the portion 14' of the primary winding 14 thus cut out of the primary circuit. This reduces the said impedance in the primary circuit, allows considerably more current to flow through the balance of the coil 14, thus substantially increasing the number of ampere-turns of the primary coil 14 and induces a greater current in the secondary circuit.

In other words, the impedance to the current due to the inductance and resistance of the induction coils, as constructed for ignition systems, may be immaterially reduced by cutting out some of the turns of the primary winding, and the reduction of this impedance by cutting out a relatively small part of the primary coil more than offsets the loss of the relatively few turns of the primary winding, so that enough more current flows through the coil to produce an actual increase in the ampere-turns sufficient for starting purposes, with fewer convolutions in the primary coil.

In the form of our invention shown in Fig. 3, the primary winding 14 of the induction coil 15 is used to actuate a vibrator or vibratory current interrupter and the external resistance coil 12 is interposed between the contact maker 18 and the primary winding 14 of the induction coil 15. In other respects the connections and wiring are similar to that present in the embodiments of our invention above described. The vibrator arm 41 is mounted upon a suitable support 42, from which it is suitably insulated, and a wire 43 is tapped into the wire 13 connecting the external resistance 12 with the primary winding 14, and this wire 43 leads to a stop and circuit point 44, against which the back of the vibrator arm 41 normally presses. A wire 45 leads to a switch 46 (which may be a push button) and thence a wire 47 leads to earth or ground. This modification differs from that shown in Fig. 1 in that the primary wires 20 between the battery 1 to the contact maker 18 are connected by grounding them; the switch 10 and lead 11 are omitted, the wire 9 leads directly to the primary coil 14, and the relative position or location of the induction coil 15 and external resistance coil 12 in the primary circuit are reversed.

As above stated, the contact device 18 is preferably of the closed circuit type, and hence the primary circuit would normally be a divided one since the circuit is normally closed through the contact maker 18. With this divided primary circuit the vibrator 41 would probably not operate to break the circuit at the point 44, but as soon as the engine turns over and the primary circuit is broken through the contact maker 18, all of the primary circuit flows through the primary winding 14 of the induction coil 15 and thence through the lead 43, vibrator 41, wire 45, switch 46 and wire 47 through ground back to battery 1. This completely cuts out the resistance 12 in the primary circuit and therefore increases the number of ampere-turns in the primary winding 14. With this strong current and the spark induced in the secondary circuit by the vibration of the vibrator 41 a hot enough spark is induced at the spark plugs 28 to ignite a cold charge in the cylinders when the switch 5 of the starting circuit is closed or for any other reason the voltage of the battery 1 is reduced.

In Fig. 4 is shown an arrangement similar to that of Fig. 3 except that an independent or master vibrator coil is employed to operate the vibrator 41 instead of using the primary winding of the induction coil 14 for that purpose. In this arrangement the wire 13 between the primary winding 14 and the external resistance 12 is tapped into by a wire 48 leading to the master vibrator coil 49. The wire 43 connects the master coil 49 with the stop 44 against which the vibrator 41 normally rests. The resistance of the coil 49 is much lower than the resistance of the external resistance coil 12; therefore, when the circuit is broken by the contact maker 18 all of the current drawn from the battery 1 passes through the primary winding 14 and thence through the master vibrator coil 49 and thence through the vibrator 42 to the earth and to battery 1 in the same manner as that described in connection with Fig. 3. In other respects than those above described, the arrangement of the apparatus shown in Fig. 4 is like that illustrated in Fig. 3.

It is, of course, obvious that the contact device 18 indicated in all the arrangements above described, may be a normally open circuit type of contact device, which momentarily closes the primary circuit to induce the sparking current in the secondary circuit, and the operation would be exactly the same as that above described in so far as Figs. 1 and 2 are concerned. With the circuit closer 18 operating as a normally open circuit type of contact device, in the arrangement shown in Figs. 3 and 4, the vibrator 41 would always immediately and continuously operate upon the closing of the switch 46 and the sparking current would be distributed to the cylinders by the distributors 21, and the circuit through the external resistance coil 12 and contact maker 18 would be a broken one practically all the time. To cut out the external resistance 12, increase the ampere-turns of the coil 15, and induce a stronger sparking current in the secondary circuit, it would be only necessary to close the switch 46.

But this reducing of the resistance in the primary circuit to increase the number of ampere-turns in the primary winding of the induction coil for inducing a greater current in the secondary for starting purposes is just as applicable to a system in which the battery 1 is used only to supply current to the ignition system and the engine is started by hand or by a starting mechanism which does not draw its energy from the battery 1. This feature of the invention is exemplified in all the arrangements above described when the starting switch 5 is open, and the current from the battery 1 is not used to turn the motor 2, and while the invention has been shown in the drawings as applied to a system in which the battery supplies the current to the starting motor and to the primary circuit of the ignition system, the invention is not to be construed as being limited thereto, because it applies equally well to those engines which are started by hand or by other mechanical starting mechanisms. If the battery 1 be partially exhausted or depleted so that the spark produced in the secondary circuit is insufficient to ignite a cold charge when the engine is turned over by hand, the switch 38 may be closed to short circuit the external resistance of the system illustrated in Figure 1, or the switch 40 may be open and the switch 38 may be closed in the arrangement shown in Fig. 2 to reduce the impedance in the primary circuit and to increase the number of ampere-turns in the primary coil 14, or the switch 46 of the arrangement shown in Figs. 3 and 4 may be closed to short circuit the external resistance coils 12 and to cause the increased primary current to actuate the vibrator 41 to induce a greater current in the secondary circuit. Any of these operations increases the ampere-turns in the primary winding of the induction coil and induces a greater current in the secondary circuit without changing or altering the connections of the circuits with the battery. The battery connections to the starting circuit and to the ignition circuit remain at all times the same.

Having thus described our invention, what we claim and desire to protect by Letters Patent of the United States is:

1. In an ignition system, the combination of a primary circuit including a timer, a secondary circuit including a distributor, a normally open shunt circuit around said timer having a less resistance than the resistance of the shunted portion of said primary circuit, a current interrupter in said shunt circuit, and means for closing said shunt circuit.

2. In an ignition system, the combination of a primary circuit including a timer and a resistance element, a secondary circuit including a distributor, a normally open shunt circuit around said resistance element and timer and having less resistance than that of said resistance element, a current interrupter in said shunt circuit, and means to close said shunt circuit.

3. In an ignition system, the combination of a primary circuit including a primary coil, a timer, and a resistance element, a secondary circuit including a distributor, a normally open shunt circuit around said resistance element and timer and having less resistance than the shunted portion of said primary circuit, a current interrupter in said shunt circuit, and means for closing said shunt circuit.

4. In an ignition system, the combination of a primary circuit including a primary coil, a timer, and a resistance element, a secondary circuit including a distributor, and a normally open shunt circuit around said resistance element and timer and having less resistance than the shunted portion of said primary circuit and including a coil, a current interrupter operated by said coil, and means for closing said shunt circuit.

5. In an ignition system, the combination of a primary circuit, including a primary coil, a timer and a resistance element, a secondary circuit including a secondary coil and a distributor and means to increase the current in said primary coil for starting purposes comprising a normally open shunt circuit around said timer and resistance element and having less resistance than the shunted portion of said primary circuit, a current interrupter in said shunt circuit, and means to close said shunt circuit.

6. In an ignition system, the combination with a primary circuit including a battery, a primary coil and resistance coil and a timer of a secondary circuit including a secondary coil, a distributor and spark plugs, and means to produce a hot spark for starting and other purposes comprising a shunt circuit of low resistance around said resistance coil and timer, a current interrupter in said shunt circuit, and means to close said shunt circuit.

7. In an ignition system, the combination of a primary circuit, a high tension secondary circuit, a normally open shunt circuit around a portion of the primary circuit and having an impedance less than the impedance of said shunted portion, a current interrupter in said shunt circuit, and a switch in said shunt circuit.

In witness whereof, we have hereunto set our hands this 21st day of July, 1917.

ARTHUR ATWATER KENT.
WILLIAM A. EVANS.